United States Patent
Ching

[11] 3,828,311
[45] Aug. 6, 1974

[54] AMBIENT LIGHT WARNING DEVICE

[76] Inventor: Pai Ping Ching, 30 Hamilton Ave., Staten Island, N.Y.

[22] Filed: Sept. 27, 1971

[21] Appl. No.: 184,037

[52] U.S. Cl. ................... 340/84, 340/213 R
[51] Int. Cl. ............................... G08b 5/00
[58] Field of Search ............ 340/213 R, 84 R; 356/320 R; 40/130 B

[56] References Cited
UNITED STATES PATENTS
1,900,059   3/1933   Hayter .................. 40/130 B Primary Examiner—Harold I. Pitts
Attorney, Agent, or Firm—W. Lee Helms

[57] ABSTRACT

A device acting to warn persons, such as motor vehicle drivers, students and the like studying or reading, and persons under like conditions of insufficient ambient light, that the light is insufficient and should be increased.

2 Claims, 4 Drawing Figures

PATENTED AUG 6 1974   3,828,311

INVENTOR.
PAI-PING CHING
BY *H. Lee Helms*
ATTORNEY

AMBIENT LIGHT WARNING DEVICE

The device comprises a container with a pair of mutually facing, and preferably translucent, sheets or plates tinted with contrasting colors, these light-emissive members may be of glass. The inner sheet or plate receives a light glow from an electric lamp of low intensity. The outer sheet receives the environment light and will face the user and be readily visible. The action is that environment light of satisfactory predetermined intensity overcomes the illumination of the inner colored sheet or plate, and it is rendered neutral, whereas when the environment light drops to a predetermined degree of dimness, the illumination of the inner colored sheet or plate overcomes said environment light.

The device will be described with reference to the accompanying drawings, in which.

Figure 1:
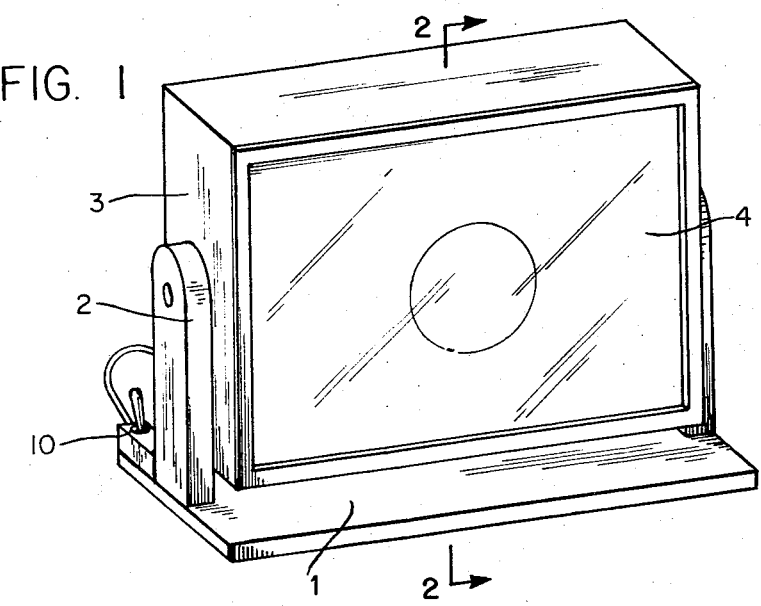
FIG. 1 is a perspective view of the device in one form, looking at the environment face thereof as to normal position for visibility by the user.

Referring to FIG. 1 of the drawings, there is shown thereby an embodiment suitable for positioning on a desk top or table, or otherwise supported, for use by a reader or student, and also generally. On base member 1, having uprising arm 2, is a box-like container 3; and of course the opposite end of the base member will have a corresponding uprising support. In FIG. 1 the supporting arm 2 receives a pivot member leading within the adjacent side of the member 3, so that the latter may be angularly adjusted. The front tinted, and preferably translucent, sheet or plate is shown at 4.

Figure 2:
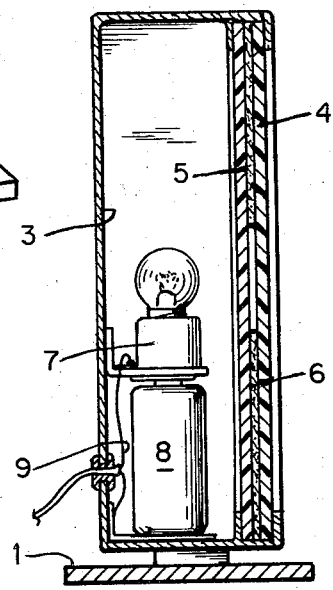
FIG. 2 is a vertical sectional view taken on the line 2—2, FIG. 1.

The vertical sectional view of FIG. 2 shows that within the container 3, there is positioned back of the tinted sheet or plate 4, a like tinted sheet or plate of a different color (color indications not being shown). Any difference as to color between the sheets or plates may be employed, and for example the said inner like sheet 5 may be colored red and the outer environment light receiving member 4 may be colored green or formed of uniformly dispersed tint, as for example that of a transparent or transluscent solid plastic sheet, or of glass.

In the present embodiment a mask is shown between the two tinted sheets or plates, and which has, as more clearly indicated in FIG. 1, a round opening. This is shown to indicate that by cutting warning insignia into such a mask, such as the words: "Warning, you need more light," the user will have an increased mental impulse to increase the degree of illumination environment when the latter falls below the proper degree. However such a mask may be eliminated if desired.

Within the container 3 rearwardly of the tinted sheets or plates is an electric lamp generally indicated at 7, as shown in FIG. 2. For purposes of illustration the said Figure indicates that the lamp is battery activated, as by a dry cell battery 8. Lead wires 9, shown schematically will in practice lead to a switch 10, FIG. 1.. However in practice the wiring will be led from a building circuit, via a switch, to the lamp, generally speaking.

Figure 3:
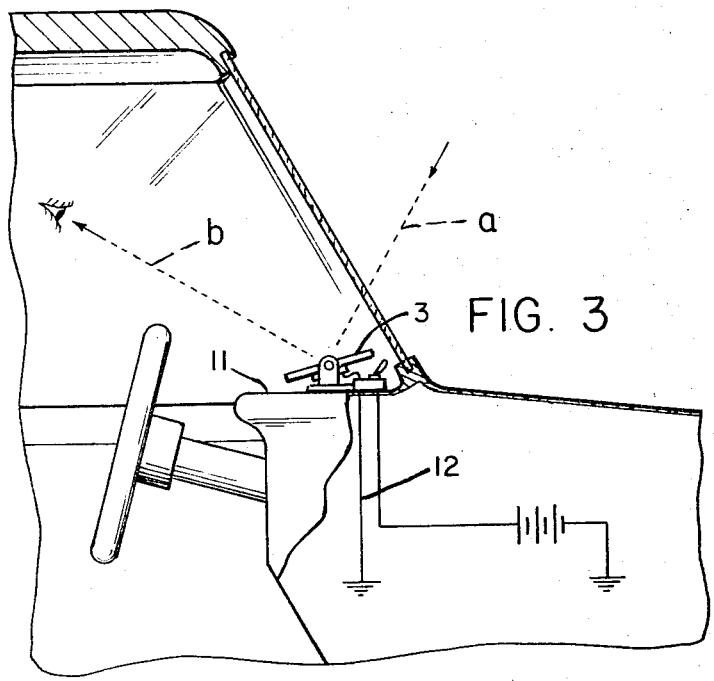
FIG. 3 is a schematic view looking through a fragmentary longitudinal section of the front area of a motor vehicle, showing the device positioned on the top dash-board, dotted lines indicating egress of environment light and the angle of sight to the device by a driver, together with electrical leads.
Figure 4:
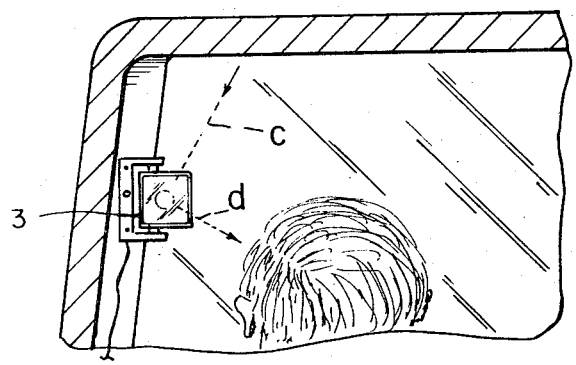
FIG. 4 is a fragmentary vertical section through the area rearwardly of the motor vehicle wind shield, with the device mounted on a side post, dotted lines leading light from the outside environment light to the front face of the device, and dotted lines leading therefrom to the face area of a driver indicating his path of sight.

As shown in FIG. 3, for motor vehicles the device may be mounted within the car, as to the top dash board, and its lamp connected by wiring 12 to the car battery. In said FIG. 3, dotted lines at *a* indicate the path of the environment light, and dotted lines *b* the path of sight from the eyes of the car driver, the device being pivoted. In FIG. 4 there is indicated a positioning of the device rearwardly of the wind shield of a motor vehicle but angularly with respect to the outer environment light so that the latter strikes the outer tinted sheet or plate 4, FIGS. 1 and 2. Dotted lines *c* and *d* indicate, respectively the path of the environment light and the sight path of the car operator, the head of the latter being shown as to the back thereof.

It will be understood that various modifications may be made in the form of the embodiment shown in the various Figures of the drawing. For example a rheostat may be used to adjust the glow of the lamp, particularly when it is fed by a house or other building circuit. The device has various uses, and it can be incorporated in clocks or television cases to guide the proper degree of illumination in a room, etc.

Having described my invention, what I claim and desire to secure by letters patent, is as follows:

1. A device operative to warn persons such as motor vehicle drivers, students and persons under like conditions of insufficient ambient light, that the light is insufficient and should be increased, comprising a container with a pair of mutually facing light emissive members having mutually contrasting colors, an electric lamp within the container and of relatively low intensity, means for passing an electric current to the lamp, the outer light emissive member receiving the environment light and visible to the user, the electric lamp being adapted to overcome the environment light when the latter drops to predetermined degree of dimness, whereupon the illumination by said electric lamp causes a color glow of the inner colored light emissive member to visually appear at the outer face of the outer light emissive member as a warning to indicate need for greater environment illumination.

2. A warning device constructed in accordance with claim 1, in combination with a mask interposed between the two colored light emissive members, said mask being formed with apertures to control the form of the color-glow light emissive member.

* * * * *